April 3, 1962 G. W. NEWTON 3,027,896
ANALGESIC INHALER
Filed Jan. 29, 1960

INVENTOR.
George W. Newton

BY Marston L. Hamlin

ATTORNEY

United States Patent Office 3,027,896
Patented Apr. 3, 1962

3,027,896
ANALGESIC INHALER
George W. Newton, 1306 Alabama Ave., Durham, N.C.
Filed Jan. 29, 1960, Ser. No. 5,558
4 Claims. (Cl. 128—195)

This invention relates to an analgesic inhaler. More particularly it relates to an inhaler of small size adapted to self-administration of a volatile drug such as an analgesic, and so compact that it may readily be carried in a physician's bag or even in a jacket pocket.

In my patent with Dr. Charles R. Stephen, No. 2,677,370 for Therapuetic Inhaler, an inhaler is disclosed and claimed which has met wide and favorable acceptance for hospital and other professional use.

It has become apparent that there is a further wide field of utility for an inhaler of less capacity, somewhat less refined control means and greater compactness. This field comprises first-aid equipment for rescue squads, mass pain relief in major catastrophes, bedside use in physicians' house visits, and other situations where small size and extreme portability are essential.

Accordingly it is an object of this invention to furnish an inhaler meeting these requirements.

It is a further object of my invention to furnish such an inhaler that is economical to construct in that it has no soldered or threaded joints and no moving metal parts.

Other objects and advantages will be apparent to those skilled in the art from the following disclosure.

According to my invention I construct my inhaler with a body consisting of a light-gage metal tube open at both ends. While the size is not critical, I have found that convenient dimensions are, length 50–60 mm. and diameter 25–35 mm. The metal tube acts not only as a container but as an efficient heat-transfer medium between the inhaler and the patient's hand. Since evaporation of the volatile drug tends to lower the temperature, transfer of heat from the patient's hand tends to counteract this and to maintain a more constant evaporation rate.

The ends of the tube are closed by semi-rigid plastic caps forming vapor-tight friction joints with the body. Suitable plastics are polyethylene, nylon, semi-rigid vinyl plastics, polyester resins and the like.

The bottom cap is pierced by a central opening which serves both as a fill hole and air inlet. The top cap has a central opening in which is fixedly mounted a central tube of much smaller (e.g. ¼–½) diameter than the body, extending into the body nearly to its bottom and extending upwardly outside the body a sufficient distance to permit attachment of a mouthpiece as is described below.

The bottom end of the tube is provided with air-vapor inlet ports and an inverted frusto conical baffle which surrounds and shields the inlet ports. The tube may advantageously be provided with a transverse baffle below the frusto conical baffle and may be extended downwards to end in a solid downwards directed conical point. This point serves as a convenient means for rupturing a sealed glass or plsatic ampule containing the volatile drug with which the inhaler is to be charged. The upper end of the tube is open and is provided with a dilution port opening into the side of that portion of the tube extending beyond the upper cap.

A cylindrical wick is located inside the body tube closely adjacent the inside tube surface. This wick is sufficiently thick to absorb a charge of volatile drug (e.g. 5 to 7 ml.), but sufficiently thin so that a substantial free space exists between the wick and the central tube.

My inhaler also includes a mouthpiece or adapter which the user may hold in his mouth or which may connect the central tube to a conventional inhalation mask. This mouthpiece or adapter is constructed to be retained on the upper end of the central tube by a tight sliding fit so that it may be positioned to cover more or less of the dilution port, thus providing regulation of the vapor concentration inhaled.

In spite of its small size and simplicity of construction, my inhaler permits regulating the concentration of vapor inhaled to an adequate degree and furnishes a satisfactorily constant concentration during the consumption of a charge, i.e. with a fixed setting of the opening of the dilution port my inhaler will deliver a satisfactorily constant vapor-air mixture during its period of use.

A preferred embodiment of my invention is described below and illustrated in the attached drawing, but the description and drawing are intended to be exemplary only and not to limit the scope of my invention which is defined in the appended claims.

Figure 1:
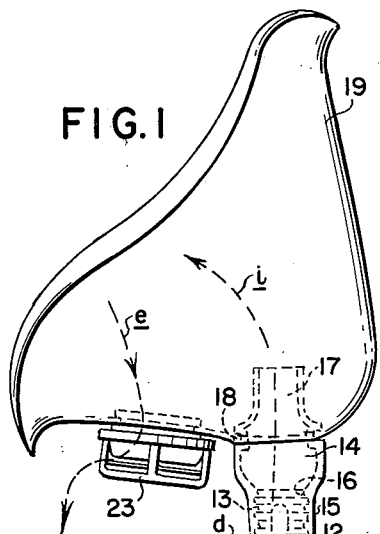
FIG. 1 is a side view of my inhaler with attached mask, partly in section.

The cylindrical body 1, of light-gage metal, is capped at both ends by, respectively, a lower circular cap 2 and an upper circular cap 3. These caps may be identical in form and dimensions. Each is provided with a cylindrical extension 4 on its outer edge and with a second cylindrical extension 5, extending in the same direction as extension 4, and surrounding a central circular opening 6. Caps 2 and 3 are made of a semi-rigid plastic and are so dimensioned that extensions 4 make a vapor-tight friction fit with the exterior of body 1 and extension 5 (in cap 3) makes a vapor-tight friction fit with central tube 7. The caps may advantageously be made of polyethylene or nylon.

For a 5 ml. charge of volatile analgesic, body 1 may be, for example, approximately 50 mm. long with an internal diameter of approximately 25 mm., and tube 7 may have, for example, an external diameter of about 11 mm. and an internal diameter of about 9.5 mm.

Tube 7 is provided at its lower end with one or more holes 8 serving as inlet ports and an inverted frusto conical baffle 9, surrounding and shielding the inlet ports. Since opening 6 in the lower cap 2 serves as a fill-hole as well as an air inlet, tube 7 may also be provided with a flat transverse baffle 10 to facilitate distribution of the volatile liquid charge on the wick, but this is not essential. Downwardly directed point 9' may be provided as a rupturing means for sealed ampules containing the volatile drug to be charged into the inhaler if the drug is furnished in such containers.

To ensure the security of caps 2 and 3 on body 1, they may be provided with complementary circular grooves and fillets as indicated at 11. Similarly tube 7 may be secured in cap 3 by complementary grooves and fillets 11'. Since the caps are made identical for economy, a non-functional fillet 11'' is shown on extension 5 of cap 2.

Central tube 7 is open at its upper end and in the portion extending outside cap 3 is provided with a dilution port 12, preferably an elongated opening. The top of tube 7 is also advantageously provided with a series of circumferential grooves and ridges 13 to facilitate regulation of the concentration of vapor inhaled as described below.

The mouthpiece 14 of my inhaler is made of a more flexible plastic than caps 2 and 3. It has a lower extension 15 dimensioned for a vapor-tight slide fit over the top of tube 7 and is advantageously provided internally with one or more grooves and ridges 16 mating with grooves and ridges 13 on tube 7. It may thus be slid up and down on tube 7 to expose more or less of dilution port 12, but is prevented from accidental dislodgment by the engagement of grooves and ridges 13 with the complementary grooves and ridges 16 on the mouthpiece.

The mouthpiece has an upper extension 17 adapted to be held between the lips of a user in case the inhaler is used without a mask.

Figure 3:
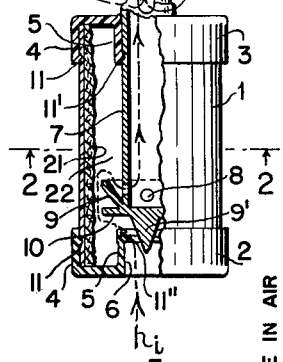
FIG. 3 is a sectional view of a modified adapter.
Figure 2:
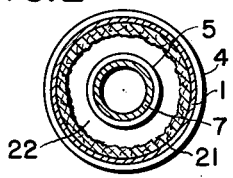
FIG. 2 is a transverse section on line 2—2 of FIG. 1.

The mouthpiece is provided with a circumferential groove 18 which enables it to be engaged, if desired, friction-tight with a conventional face mask 19. In case the inhaler is to be used exclusively with a face mask, the adapter 20 shown in FIG. 3 may be substituted for mouthpiece 14.

A cylindrical woven cotton wick 21, for example 2 mm. thick, is positioned inside body 1 closely adjacent its interior wall, leaving free a substantial vapor space 22 inside the body.

Arrowed line $i$ indicates the flow of inlet air and vapor, $d$ the flow of dilution air and $e$ the flow of exhaust air when the inhaler is in use. A conventional one-way outlet valve 23 may be installed on mask 19.

The operation of my inhaler is as follows: The inhaler is inverted and a charge e.g. 5 ml., of a volatile liquid analgesic such as trichloroethylene ("Trilene") is introduced through opening 6 in cap 2. The inhaler is then slanted and rotated until the liquid is all absorbed by wick 21.

The inhaler is then returned to a vertical position and the dilution adjusted to the patient's needs by sliding mouthpiece 14 or adapter 20, as the case may be, on tube 7 to expose the appropriate area of dilution port 12. If this port is completely closed, the patient inhales only air entering opening 6 which becomes nearly saturated with vapor on passage through cylinder 1, around baffle 9 and through tube 7. On the other hand, if port 12 is open, considerable secondary air is drawn through it on inhalation and the inhaled vapor-air mixture is correspondingly diluted.

If the patient uses only the mouthpiece, it is best if he is instructed to inhale only through the inhaler and exhale only through his nose or through open lips. If an inhalation mask is used, this precaution is not necessary.

My inhaler is intended particularly for self administration, the patient holding the inhaler in his hand and inhaling vapor until the desired degree of analgesia is reached. He may then stop administration of the drug merely by removing the inhaler from his mouth or face. If he inadvertently inhales the drug to the point of unconsciousness, his relaxed hand will fall, thus removing the inhaler and interrupting the administration of the drug. The self administration is thus self limiting.

It is obvious from this disclosure that my inhaler is adapted not only to use with volatile liquid analgesics, but may be used for administering any inhalable volatile drug having suitable physical characteristics.

Figure 4:
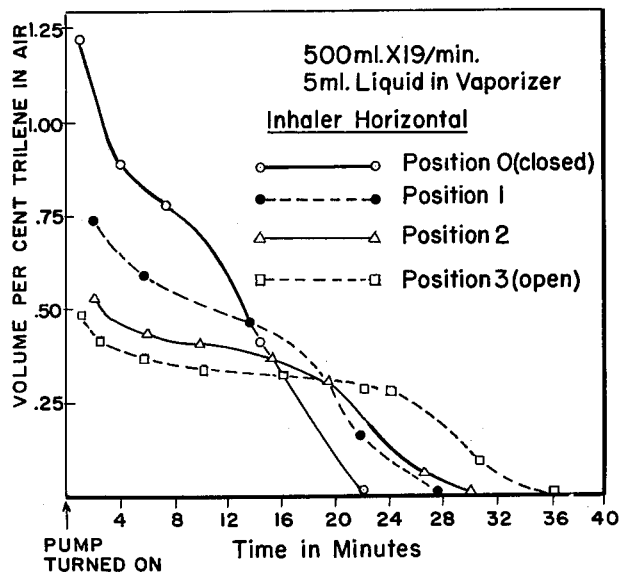
FIG. 4 is a graph illustrating the performance of one of my vaporizers when held in a horizontal position.
Figure 5:
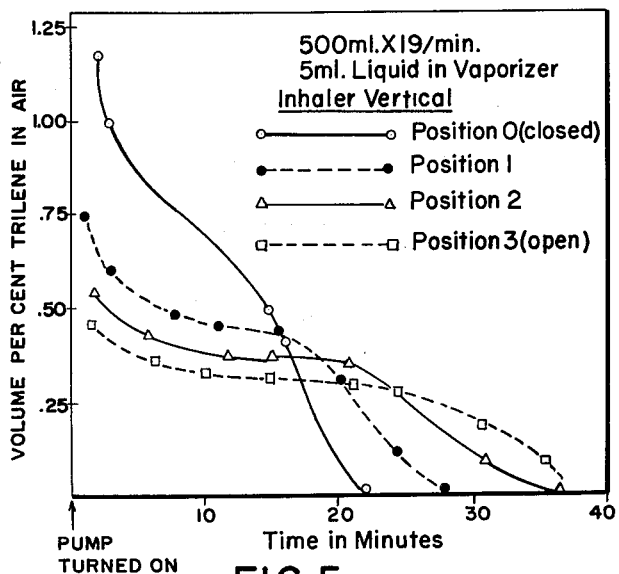
FIG. 5 is a similar graph illustrating performance of the vaporizer in a vertical position.

The performance of my inhaler in horizontal and vertical positions is illustrated respectively in the graphs of FIGS. 4 and 5. The tests on which the graphs are based were carried out with a simulated-breathing apparatus which drew air through the inhaler charged with 5 ml. trichloroethylene at a rate of 19 inspirations per minute of 500 ml. air each. The volume percent of trichloroethylene ("Trilene") in the inspired air was determined periodically. These percentages are plotted in the figures as ordinates and the times as abscissae. Four curves are plotted in each graph, one for each of four positions of mouthpiece 14 on tube 7 in which dilution port 12 is more or less open. These positions are indicated in the legends accompanying the graphs, position 0 indicating that the dilution port is closed, giving maximum trichloroethylene concentration and position 3 indicating that the dilution port is wide open, giving maximum dilution. Positions 1 and 2 are intermediate.

The graphs indicate that there is no substantial difference in performance between the horizontal and vertical positions. At the highest concentration, the inhaler yields a substantial concentration of the drug for some 15 minutes, and at lower concentrations for some 20 minutes. The charge is exhausted in 20–35 minutes.

This relatively long duration of effect with a small charge of inhalant in a small and simple apparatus is remarkable, and the tapering-off is desirable in furnishing a higher concentration for induction of analgesia and lower concentrations for maintenance.

The relative constancy of the inhaled air-vapor mixture with a given dilution setting and the duration of delivery during use from the first loading of the inhaler is thought to be due to the following facts.

After charging, the vapor space 22 rapidly reaches equilibrium with the liquid absorbed by wick 21, and as long as liquid is present in the wick, the partial vapor pressure in space 22 will have an equilibrium value dependent only on temperature. As air and vapor are removed from space 22, more liquid will evaporate to restore the equilibrium. Heat transfer through the metal body from the patient's hand tends to counteract evaporative cooling and thus tends to maintain this equilibrium. Wick 21 serves only as a convenient storage depot for the liquid. During the entire utilization of a charge, the composition of the air-vapor mixture in space 22 will remain within limits suitable for the intended use.

I claim:

1. In an inhaler adapted to self administration of a volatile drug of a size and weight to be held in the hand of a patient, said inhaler comprising a cylindrical body, a wick adjacent the inner wall of the cylindrical body, a single central tube within the cylindrical body spaced from the wick to provide an air-vapor space therebetween, a closure on the bottom of the central tube, an air-vapor port in the side of the central tube near its bottom, and an inverted conical baffle fixed to the central tube near its bottom and surrounding the air-vapor port, the improvement which comprises: a semi-rigid plastic cap with a central opening mounted with a smooth friction-tight fit on the bottom of the cylindrical body by means of an edge flange on the cap, a flange surrounding the central opening of the cap and projecting from the plane of the cap in the same direction as the edge flange, a substantially identical cap mounted with a smooth friction-tight fit on the top of the cylindrical body, the flange around the central opening of the top cap having an internal diameter of a size to receive the upper end of the central tube with a smooth friction-tight fit, the central tube being mounted at is upper end in the flanged central opening of the top cap, the bottom of the central tube being spaced above the central flange of the bottom cap a sufficient distance to provide an air passage therebetween, the length of the central tube being such that when so mounted its upper end projects through the top cap a sufficient distance to receive a tubular adapter with a tight sliding fit, a longitudinal slot in the upper end of the central tube spaced between the top cap and the upper end of the central tube, and a tubular adapter mounted on the upper end of the central tube with a tight sliding fit whereby it may be moved on the tube to cover a desired portion of the longitudinal slot.

2. An inhaler as defined in claim 1 in which the adapter has an upward extension suitable to be received in a patient's mouth.

3. An inhaler as defined in claim 1 in which the adapter is provided with a circumferential groove adapted to mate with the edges defining an aperture in an inhalation mask.

4. An inhaler as defined in claim 1 in which the central tube at its bottom end is provided below the frustoconical baffle with a flat transverse baffle and below the transverse baffle with a solid downwardly directed conical point.

References Cited in the file of this patent
UNITED STATES PATENTS

| | | |
|---|---|---|
| 1,817,148 | Hornor | Aug. 4, 1931 |
| 2,421,359 | Sutherland | May 27, 1947 |
| 2,499,734 | Edmondson et al. | Mar. 7, 1950 |
| 2,674,999 | Cox | Apr. 13, 1954 |
| 2,677,370 | Newton et al. | May 4, 1954 |